United States Patent [19]

Farwell

[11] Patent Number: 5,703,790
[45] Date of Patent: Dec. 30, 1997

[54] SERIES CONNECTION OF MULTIPLE DIGITAL DEVICES TO A SINGLE POWER SOURCE

[75] Inventor: William D. Farwell, Thousand Oaks, Calif.

[73] Assignee: Hughes Electronics, Los Angeles, Calif.

[21] Appl. No.: 607,543

[22] Filed: Feb. 27, 1996

[51] Int. Cl.$^6$ ............................................. G05F 1/10
[52] U.S. Cl. .................. 364/492; 361/86; 307/31; 340/660; 340/661; 323/220
[58] Field of Search ..................... 364/492, 232.4, 364/273.1, 483; 323/220, 282, 283, 284, 304, 234; 361/18, 86, 87; 395/750; 307/18, 19, 31, 32, 33, 34, 43, 44, 45, 52, 53, 54, 55, 151, 35, 36, 60, 61; 365/226; 340/660, 661, 662, 663

[56] References Cited

U.S. PATENT DOCUMENTS

| | | | |
|---|---|---|---|
| 4,870,570 | 9/1989 | Satoh et al. | 364/200 |
| 5,021,679 | 6/1991 | Fairbanks et al. | 307/66 |
| 5,142,684 | 8/1992 | Perry et al. | 395/750 |
| 5,153,535 | 10/1992 | Fairbanks et al. | 331/143 |
| 5,265,256 | 11/1993 | Chau-Lee et al. | 395/750 |
| 5,307,003 | 4/1994 | Fairbanks et al. | 323/222 |
| 5,311,392 | 5/1994 | Kinney et al. | 361/93 |
| 5,317,366 | 5/1994 | Koshi et al. | 355/202 |
| 5,523,978 | 6/1996 | Yoon et al. | 365/229 |
| 5,525,913 | 6/1996 | Brooks et al. | 324/771 |
| 5,530,932 | 6/1996 | Carmean et al. | 395/750 |

*Primary Examiner*—James P. Trammell
*Assistant Examiner*—Tony M. Cole
*Attorney, Agent, or Firm*—Leonard A. Alkov; Wanda K. Denson-Low

[57] ABSTRACT

A digital processing system including a first processor (11) and a second processor (21) connected in series between a first power supply node (101) and a second power supply node (103). The second processor is configured to operate at a variable processing rate, as controlled by the output of a processing rate controller (33) that is responsive to the voltage across the supply terminals of the second processor and a first reference voltage. An auxiliary shunt regulator (39) is connected across the supply terminals of the second processor and is controlled by a regulator controller (37) to prevent the voltage across the supply terminals of the second processor from exceeding a second reference voltage.

6 Claims, 1 Drawing Sheet

SERIES CONNECTION OF MULTIPLE DIGITAL DEVICES TO A SINGLE POWER SOURCE

BACKGROUND OF THE INVENTION

The disclosed invention is directed generally to digital processors, and more particularly to a digital processing system that utilizes low voltage digital processors with a higher power supply voltage.

For reasons including reduced power consumption, digital processors are being implemented to operate at lower power supply voltages. A consideration with lower power supply voltages is that power supplies are less efficient at low voltages. Also, it is difficult to retrofit low voltage digital processors in systems originally implemented with higher voltage digital processors.

SUMMARY OF THE INVENTION

It would therefore be an advantage to provide a digital processor system that employs low voltage digital processors with a power supply that provides a higher supply voltage.

The foregoing and other advantages are provided by the invention in a digital processor system that includes a first processor having a first supply terminal and a second supply terminal, the first supply terminal of the first processor being connected to a first power supply node; a second digital processor having a first supply terminal and a second supply terminal, the first supply terminal of the second processor being connected to the second supply terminal of the first processor at an intermediate supply node and the second supply terminal of the second processor being connected to a second power supply node, such that the first processor and the second processor are connected in series between the first supply node and the second supply node; the second processor operating at a processing rate that is controlled by a digital control signal; a controller responsive to a predetermined reference voltage and a voltage at the intermediate supply node for controlling the processing rate of the second processor so as to maintain the voltage at the intermediate supply node at close to the predetermined reference voltage.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
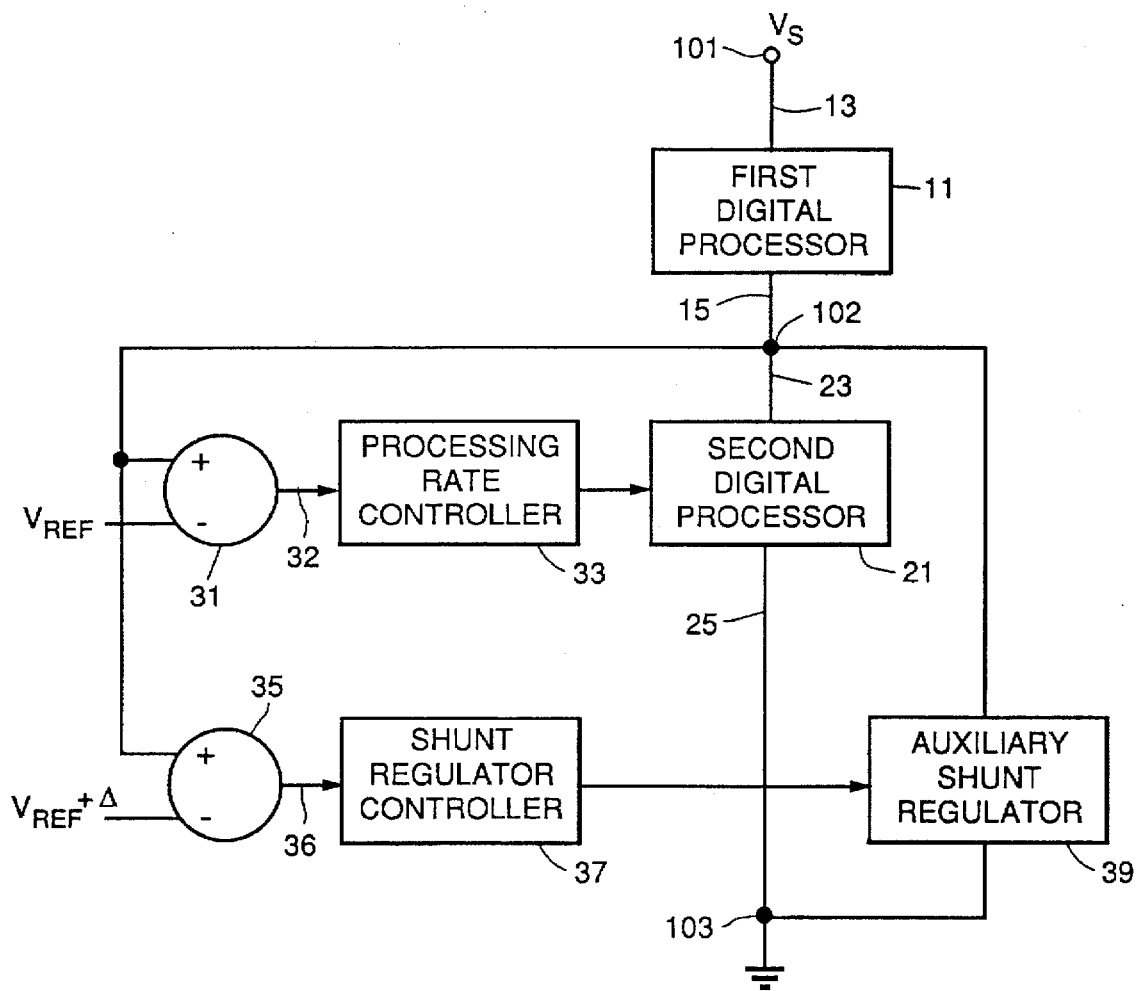
FIG. 1 is a schematic diagram of a digital processor system that includes serially connected digital processors in accordance with the invention.

In the following detailed description and in the several figures of the drawing, like elements are identified with like reference numerals.

Referring now to FIG. 1, schematically illustrated therein is a digital processor system in accordance with the invention that includes a first digital processor 11 having a first supply terminal 13 connected to a first power supply node 101 that is at a supply voltage $V_S$ relative to a ground reference potential. The supply voltage $V_S$ is provided for example by a suitable power supply connected to the first power supply node 101 and a second power supply node 103. A second supply terminal 15 of the first digital processor 11 is connected to an intermediate supply node 102.

A second digital processor 21 has a first supply terminal 23 connected to the intermediate supply node 102 and a second supply terminal 25 connected to the second power supply node 103 which is connected to the ground reference potential. The second digital processor is configured to be controllable to operate at a variable processing rate. Processing rate refers to the number of operations performed per unit time. In particular, processing rate is a function of clock frequency and the average number of operations performed per clock cycle. The power supply current drawn by a digital processor is proportional to processing rate, and the processing rate of the second digital processor 21 is controlled in accordance with the invention to adjust the current of the second digital processor 21 so as to maintain the voltage at the intermediate supply node 102 at close to a predetermined voltage, such as $V_S/2$ for the particular example wherein the first digital processor 11 and the second digital processor 21 have an identical nominal supply voltage of $V_S/2$.

The digital processor system of FIG. 1 further includes a first subtraction circuit 31 having its positive input connected to the intermediate supply node 102 and its negative input connected to a first reference voltage $V_{REF}$. The output of the first difference circuit 31 comprises a difference voltage 32 that represents the difference between the voltage at the intermediate supply node 102 and the first reference voltage $V_{REF}$, and is provided to a processing rate controller 33 which controls the processing rate of the second digital processor 21. In particular, the controller 33 increases the processing rate of the second processor 21 when the voltage at the intermediate supply node 102 exceeds the first reference voltage $V_{REF}$, so that the difference voltage 32 tends to be close to zero volts. The processing rate controller 33 can be implemented to operate in a proportional mode whereby the processing rate of the second digital processor 21 is continuously varied, or a switching mode wherein the processing rate of the second digital processor 21 is switched between a higher or lower processing rate. For example, the processing controller 33 can comprise a voltage controlled oscillator that provides a continuously variable clock frequency to the second digital processor 21. As another example, the processing rate controller 33 can comprise an interrupt circuit that provides an interrupt input to the second digital processor 21, such that processing rate of the second digital processor 21 is switched between a higher or lower processing rate.

Since the voltage at the intermediate node 102 is a function of the current drawn by the second digital processor 21, and since the amount of current drawn by the second digital processor 21 is proportional to the processing rate of the second digital processor 21, the second digital processor 21 and the processing rate controller 33 tend to maintain the voltage at the intermediate node 102 at close to the reference voltage $V_{REF}$. In other words, by controlling the processing rate of the second digital processor 21 in accordance with the invention, the current of the second digital processor 21 is adjusted to match the current of the first digital processor 11.

The digital processor system of FIG. 1 also includes a second subtraction circuit 35 having its positive input connected to the intermediate supply node 102 and its negative input connected to a second reference voltage ($V_{REF}+\Delta$). The output of the second subtraction circuit 35 comprises a difference voltage 36 that represents the difference between the voltage at the intermediate supply node 102 and the second reference voltage ($V_{REF}+\Delta$), and is provided to a shunt regulator controller 37 which controls an auxiliary shunt regulator 39. The shunt regulator controller 37 initiates current flow in the auxiliary shunt regulator 39 where the voltage at the intermediate supply node reaches the second reference voltage ($V_{REF}+\Delta$), and adjusts the current flow through the auxiliary shunt regulator 39 to prevent the voltage at the intermediate supply node 102 from exceeding the second reference voltage ($V_{REF}+\Delta$). In this manner, the auxiliary shunt regulator 39 is engaged during transients when the second digital processor 21 cannot respond fast enough to increases in the voltage at the intermediate node 102, and is disengaged while the second processor 21 is able to maintain the voltage at the intermediate supply node 102 below the second reference voltage ($V_{REF}+\Delta$). By way of illustrative example, the auxiliary shunt regulator 39 comprises a fast power transistor that passes sufficient current to ground to prevent the voltage at the intermediate node 102 from exceeding the second reference voltage ($V_{REF}+\Delta$).

Effectively, the processing rate controller 33, the second digital processor 21, the shunt regulator controller 37, and the auxiliary shunt regulator 39 form a supply voltage regulator 41 that acts like a zener diode and adjusts current to control the voltage across the supply terminals of the second digital processor 21 to be close to the reference voltage $V_{REF}$ which is selected to correspond to a nominal operating voltage of the second digital processor 21. The supply voltage $V_S$ is selected such that voltage across the supply terminals of the first digital processor 11 corresponds to a nominal operating voltage of the first digital processor 21 when the voltage at the intermediate node 102 is equal to $V_{REF}$.

The foregoing has thus been a disclosure of a digital processor system that advantageously employs low voltage digital processors with a power supply that provides a supply voltage that is higher than the voltage required by the individual digital processors.

Although the foregoing has been a description and illustration of specific embodiments of the invention, various modifications and changes thereto can be made by persons skilled in the art without departing from the scope and spirit of the invention as defined by the following claims.

What is claimed is:

1. A digital processor system connected between a first power supply node and a second power supply node, comprising:

a first processor having a first supply terminal and a second supply terminal, said first supply terminal of said first processor being connected to the first supply node;

a second processor having a first supply terminal and a second supply terminal, said first supply terminal of said second processor being connected to said second supply terminal of said first processor at an intermediate supply node and said second supply terminal of said second processor being connected to the second supply node, such that said first processor and said second processor are connected in series between the first supply node and the second supply node; and processing rate control means responsive to a predetermined reference voltage and a voltage at said intermediate supply node for controlling a processing rate of said second processor to maintain said voltage at said intermediate supply node close to said predetermined reference voltage.

2. The digital processor system of claim 1 wherein said processing rate control means includes a subtraction circuit responsive to the predetermined reference voltage and the voltage at said intermediate supply node.

3. The digital processor system of claim 2 wherein said processing rate control means further includes means for providing a variable clock frequency to said second processor.

4. The digital processor system of claim 2 wherein said processing rate control means further includes means for providing an interrupt signal to said second processor.

5. The digital processor system of claim 1 further including:

regulator control means responsive to the voltage at said intermediate supply node and a regulator reference voltage for providing a regulator control signal; and a shunt regulator responsive to said regulator control means and connected between said intermediate supply node and the second supply node, said shunt regulator preventing the voltage at said intermediate node from exceeding said regulator reference voltage.

6. The digital processor of claim 5 wherein said regulator control means includes a subtraction circuit responsive to the voltage at said intermediate supply node and a regulator reference voltage.

* * * * *